United States Patent [19]

White et al.

[11] 3,992,682
[45] Nov. 16, 1976

[54] TWO-DIMENSIONAL LASER SCANNING SYSTEM

[76] Inventors: Matthew B. White, 258 Forest Ave.; Fred W. Quelle, Jr., 120 Nichols Road, both of Cohasset, Mass. 02025

[22] Filed: Sept. 19, 1974

[21] Appl. No.: 507,646

[52] U.S. Cl. .......................... 331/94.5 K; 178/7.6; 331/94.5 M; 330/4.3; 332/7.51
[51] Int. Cl.² .................. H01S 3/10; H01S 3/101
[58] Field of Search ............ 331/94.5; 330/4.3; 332/7.51; 178/7.6

[56] References Cited
UNITED STATES PATENTS

| 3,435,228 | 3/1969 | Gordon | 332/7.51 X |
| 3,774,121 | 11/1973 | Ashkin et al. | 331/94.5 K |
| 3,817,598 | 6/1974 | Taylor | 331/94.5 K |

OTHER PUBLICATIONS

Baker, IEEE Spectrum, Dec. 1968, pp. 39–42 & 50.
Zalewski et al., Applied Optics, vol. 10, No. 12, Dec. 1971, pp. 2773–2775 (note FIG. 3).
Pole et al., in "Optical Electro–Optical Information Processing," ed. by Tippett et al. ch. 21 pp. 351–364.

*Primary Examiner*—Robert J. Webster
*Attorney, Agent, or Firm*—R. S. Sciascia; L. I. Shrago; C. E. Vautrain, Jr.

[57] ABSTRACT

A two-dimensional dye laser scanning system is provided wherein a dye laser having a controlled output wavelength is combined with a diffractive beam-bending device to produce a near infrared or visible laser beam that can be directed to scan in two orthogonal planes at 100 MHZ rates.

6 Claims, 7 Drawing Figures

TWO-DIMENSIONAL LASER SCANNING SYSTEM

The invention described herein may be manufactured and used by or for the Government of the United States of America for governmental purposes without the payment of any royalties thereon or therefor.

This invention concerns optical beam bending and, more particularly, a laser beam scanning system in which the laser output wavelength is controlled and the laser beam is deflected in a scanning mode.

Recent advances in dye laser technology have made available a multiplicity of tunable laser sources with output wavelengths in the visible portion of the spectrum. Such sources are available with tunabilities ranging from 200A° to 400A° and, through the use of appropriate intracavity wavelength selective devices, they can provide output wavelength spreads on the order of 0.1A°. A composite arrangement of an active medium, intracavity angle and wavelength selective electro-optic elements, and a diffraction grating outside the cavity can now be used to provide one form of a two-dimensional laser scanning system. Another arrangement using a low power oscillator, a high power amplifier and a diffractive beam deflector can also be used to produce a nearly uncoupled two-dimensional scan.

Accordingly, it is an object of the present invention to provide a two-dimensional laser scanning system.

Another object is to provide a laser scanning system wherein differential laser cavity losses are effective in determining the direction of intracavity propagation.

A further object of the invention is to provide a laser scanning system for producing optical laser displays in two dimensions at 100 MHZ rates.

A further object of the invention is to provide a two-dimensional laser scanning system wherein the laser beam is deflected in only one plane prior to amplification.

Other objects, advantages and novel features of the invention will become apparent from the following detailed description thereof when considered in conjunction with the accompanying drawings in which like numerals represent like parts throughout and wherein.

In one embodiment, a dye laser having an output wavelength that is controlled by the voltage applied to an intracavity element is used in conjunction with a diffractive traveling wave deflector to produce a near visible or visible laser beam that can scan in two orthogonal planes at 100 MHZ rates. In this embodiment, the wavelength controlled dye laser output is passed through the traveling wave deflector and a weak first order diffracted beam component is amplified by means of a high gain dye laser amplifier and thereafter is allowed to strike a fixed diffraction grating with grooves that run normal to the lines of constant refractive index in the traveling wave deflector. Upon passing through this grating, the light beam is deflected in a plane normal to the diffraction plane of the traveling wave deflector. The amount of deflection produced by the fixed grating is determined principally by the laser output wavelength, i.e. by the voltage applied to the intracavity wavelength selecting element.

In another embodiment, a direction and frequency degenerate laser cavity is employed which contains two electro-optic elements. In the absence of the intracavity electro-optic elements, this laser can oscillate with the collimated portion of the intracavity radiation field making an arbitrary angle $\beta$ with respect to the optical axis of the system, and with output wavelength lying anywhere within the fluorescent gain profile of the active medium. The intracavity electro-optic elements are selected so that the transmission loss for radiation passing through each of them is dependent upon the direction of propagation $\beta$, the wavelength of the radiation, and the voltages applied to the wavelength selecting components. For a given pair of applied voltages there exist unique values of $\beta$ and wavelength which yield nearly zero composite loss through both components. Thus by varying the applied voltages, both of the parameters can be controlled.

Figure 1:
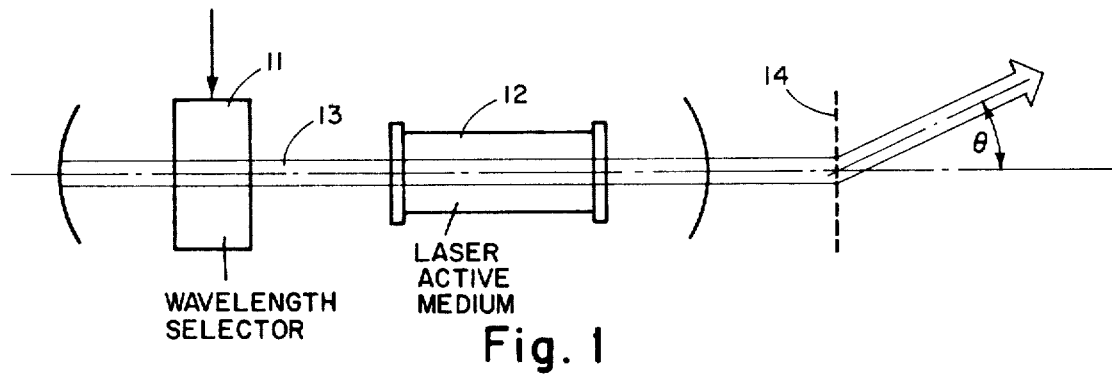
FIG. 1 is a schematic diagram of a one-dimensional $CO_2$ laser beam scanning system.

Referring to FIG. 1, a conventional one-dimensional scanning system is shown wherein an intracavity electro-optic wavelength selecting device 11 is used to select the particular rotation/vibration transition on which a $CO_2$ plasma laser 12 having an optical axis 13 oscillates. The output is passed through, or reflected from, a diffraction grating 14 that is blazed for maximum energy in the order $\eta$. After passing through grating 14, most of the laser power is propagated at an angle $\theta$ with respect to optical axis 13. Changes in wavelength are produced by electro-optically switching the laser output from one $CO_2$ laser transition to another according to the grating equation:

$$D \sin \theta = \eta \lambda$$

where $D$ = grating spacing
$\lambda$ = wavelength
$\eta$ = order

Such a controlled one-dimensional scanning of a $CO_2$ laser beam is not very useful because continuous variation of the $CO_2$ laser output wavelength and thus continuous scanning is not possible, $9\mu$ to $11\mu$ $CO_2$ laser output is not directly applicable for visual displays, and $CO_2$ laser output wavelengths are not ideally suited for optical memory type applications since special optics are required and the focused spot diameters that are achievable are much larger than those that can be readily obtained in the visible.

Figure 3:
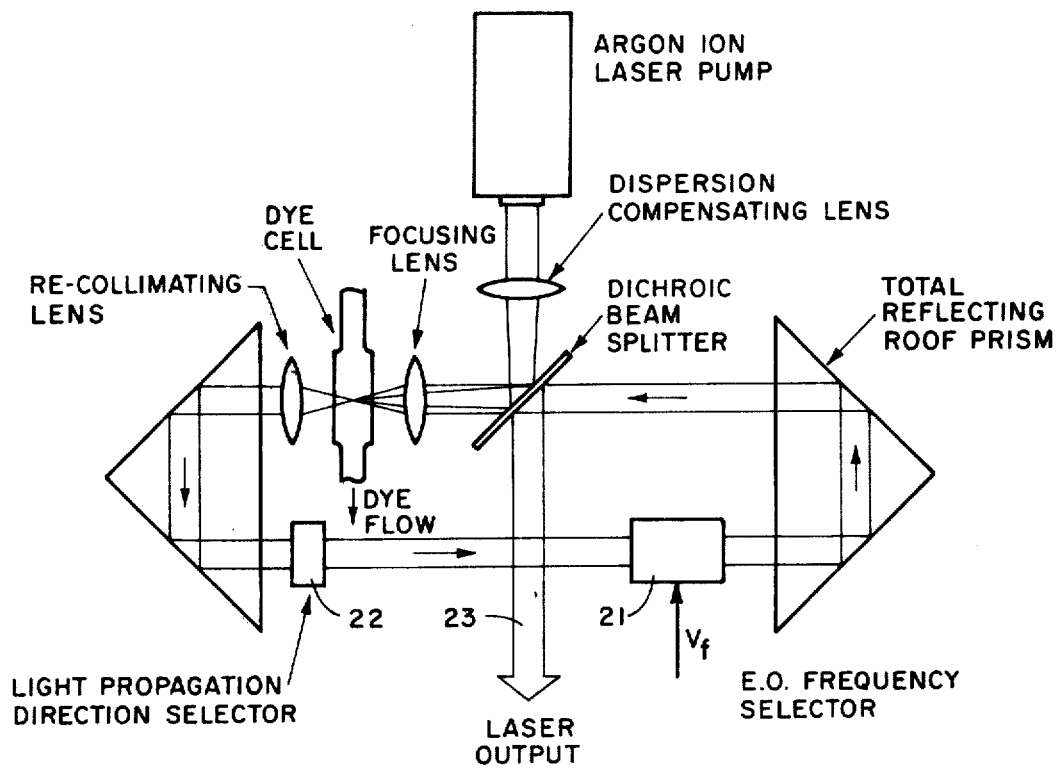
FIG. 3 is a schematic diagram of a frequency controlled CW dye laser for use in the system of FIG. 2.
Figure 2:
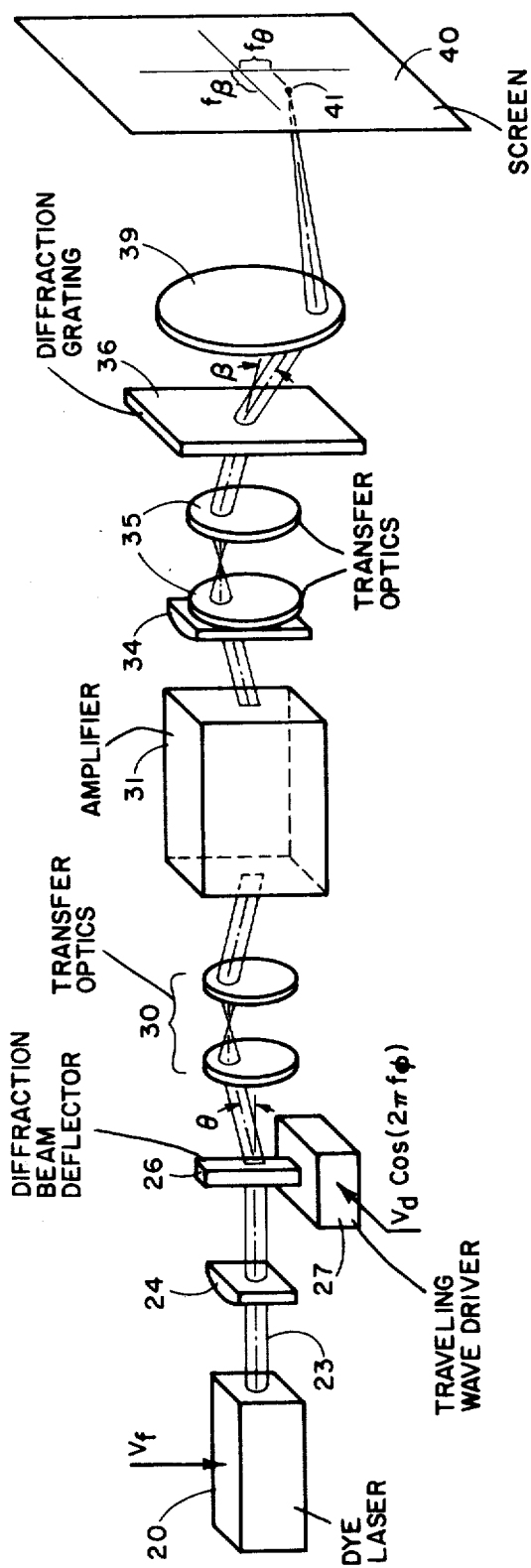
FIG. 2 is a schematic diagram of a two-dimensional random access dye laser beam deflection system.

With recent advances in dye laser technology, a new tunable laser source with output wavelength in the visible is now available. FIGS. 2–3 illustrate a two-dimensional laser beam scanning system which makes use of recent dye lasers and includes a frequency controlled CW dye laser 20 with output characteristics that are controlled by a wavelength selecting device 21 and a light propagation direction selector 22.

The laser output, indicated at 23, is passed through a line focusing cylindrical lens 24 and a diffraction beam deflector 26 which causes a small percentage of incident radiation to be deflected through an angle whose magnitude is determined by the wavelength of the traveling wave and, to a lesser extent, by the optical wavelength. Deflector 26 is controlled by a traveling wave driver 27, with the angle θ of the diffracted beam to the optical axis selected by adjusting the frequency of the traveling wave driver. The diffracted beam is then redirected through transfer optics 30 to a directionally degenerate regenerate amplifier 31 which is shown in detail in FIG. 4 and which highly amplifies the weak incoming beam. The amplified beam is then reformed and redirected by a cylindrical-spherical lens doublet 34 and transfer optics 35 to a diffraction grating 36 which selectively diverts the beam at an angle β with respect to the plane of the drawing. The beam is now focused by a lens 39 on a screen or other planar surface 40 with the point of focus, 41, subject to being scanned over screen 40 within the orthogonal limits of angles θ and β.

Figure 4:
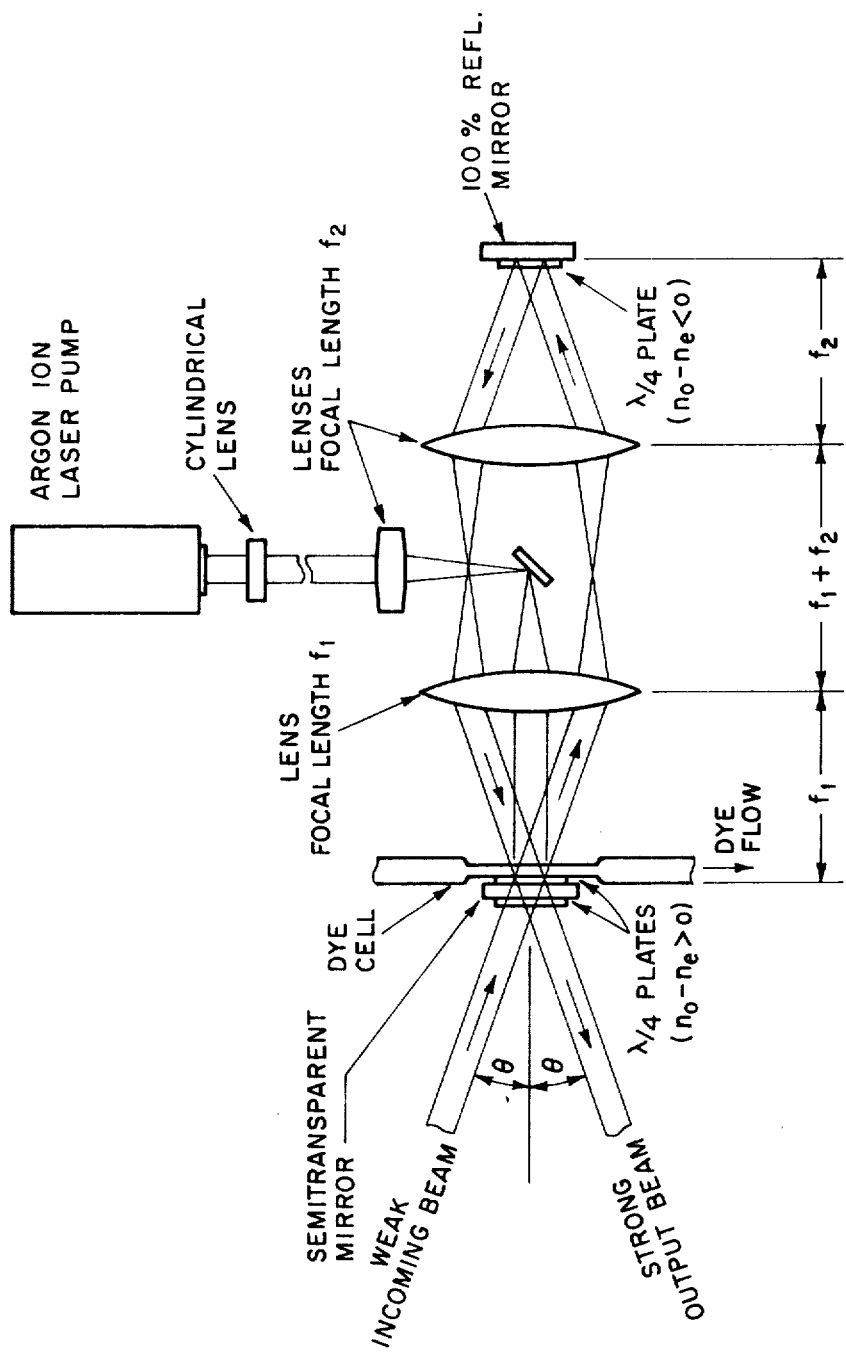
FIG. 4 is a schematic diagram of a directionally degenerate regenerative amplifier for use in the laser system of FIG. 2.
Figure 5:
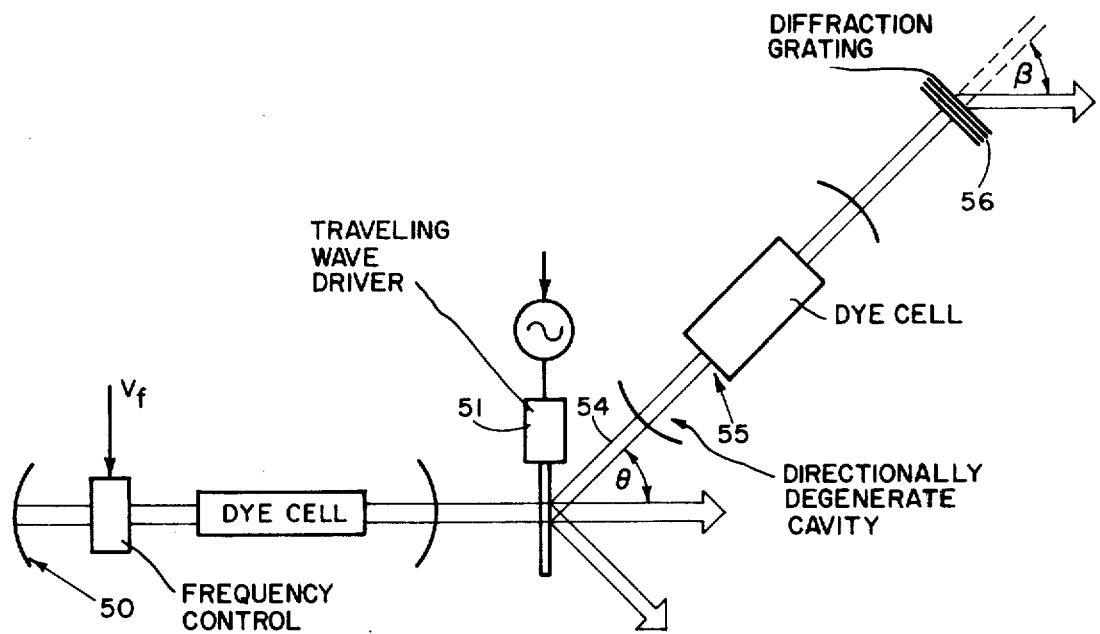
FIG. 5 is a schematic diagram of an alternate embodiment of the system of FIG. 2.
Figure 6:
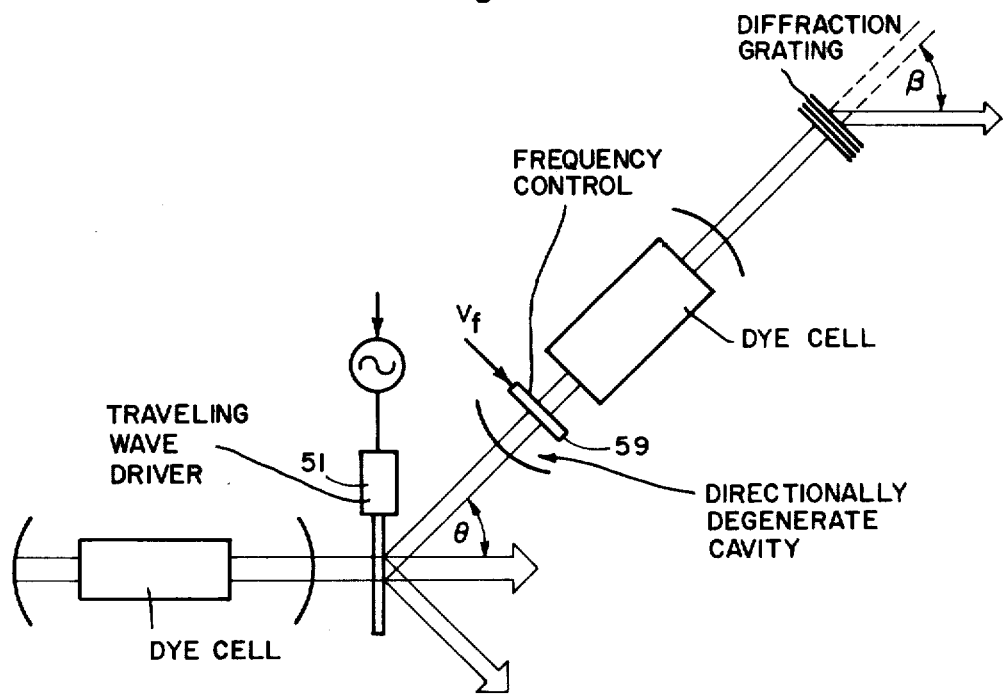
FIG. 6 is a schematic diagram of a further embodiment of the system of FIG. 2.

FIGS. 5 and 6 show the system of FIGS. 2–4 in simplified schematic form to illustrate alternate embodiments of the invention. In FIG. 5, a low power frequency controlled dye laser is shown in a laser cavity 50 whose beam output is deflected at angle θ by a frequency scannable traveling wave driver 51 which can operate in an acoustic or electromagnetic mode. A resulting weak deflected first diffraction order beam indicated at 54 is passed through a high power free running dye laser 55 having a directionally degenerate cavity and through a diffraction grating 56 wherein the beam is deflected out of the plane of the drawing at angle β. In FIG. 6, the frequency selection necessary for obtaining deflection, β, is accomplished by positioning frequency control $V_f$ within the degenerate cavity as indicated at 59.

Figure 7:
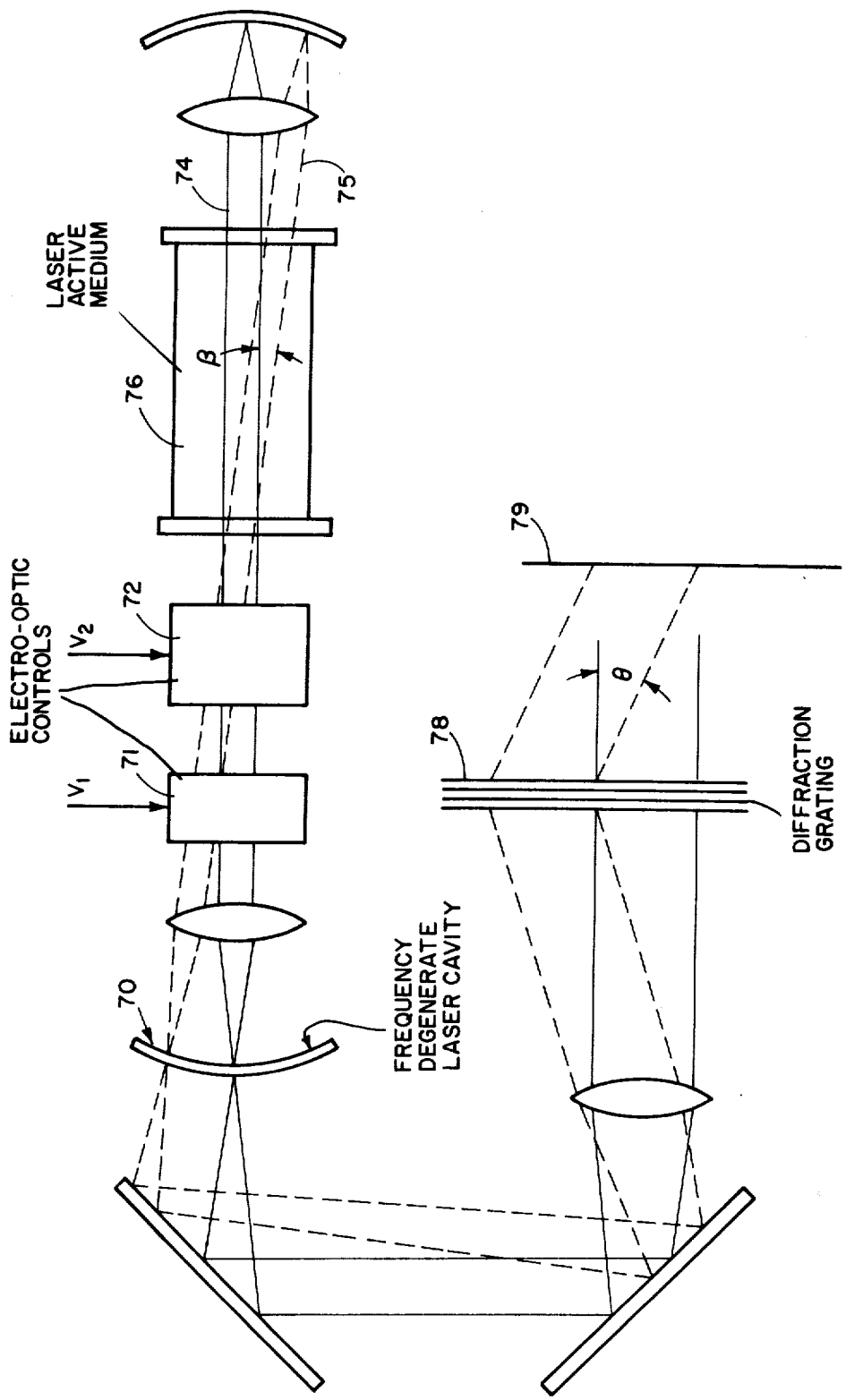
FIG. 7 is a schematic diagram of a two-dimensional laser beam scanning system using a direction and frequency degenerate laser cavity.

In FIG. 7, a direction and frequency degenerate laser cavity 70 is employed which includes angle and wavelength electro-optic controls shown at 71 and 72, respectively, and which, without these controls, is capable of oscillating with the collimated portion of the intracavity field, indicated at 74, making an arbitrary angle β with respect to the optical axis 75 of the system and having output wavelengths lying anywhere within the fluorescent profile of the laser active medium 76. Controls 71 and 72 preferably are a polarizer/electro-optic-birefringent-element combination and an electro-optic Fabry-Perot etalon, respectively. The β deflection is produced by beam 74 pivoting in the plane of the drawing about a point which can be anywhere along the longitudinal axis of the laser beam. Adjustment of the voltages $V_1$ and $V_2$ applied to controls 71 and 72 can be used to control the conditions of least loss and thereby, the direction and wavelength of the laser output. The angular deviation θ out of the plane of the drawing is produced by a grating 78 and is dependent only on λ. Thus, a two-dimensional scan on a screen or other planar surface 79 is obtained in which θ and β are unique functions of $V_1$ and $V_2$.

The θ resolution of the scanning system of FIG. 7 is, as indicated above, determined by the wavelength selectivity of the electro-optic components 71 and 72. The β resolution depends upon the angular selectivity of these components and on the strength of competition effects within the laser medium. Experiments with 3.4μ He-Ne lasers have shown that because of competition effects, very modest differential losses on the order of $10^{-4}$ cm$^{-1}$ can be very effective in determining the direction of intracavity propagation even in very high gain, i.e. $10^{+4}$ m$^{-1}$, laser systems. The switching time of the laser system is determined by the response speed of the electro-optic components and the time necessary for one mode of laser oscillation to die out and another to build up. The inherent response times of electro-optic devices are generally less than 1 nanosecond, while for a typical dye laser cavity a mode decay time of less than 5 nanoseconds is expected.

There is thus provided a method of combining dye laser output wavelength control means with an intracavity spatial mode selection method or a diffractive electro-optic beam deflection means outside the cavity to produce high-speed, random access two-dimensional beam deflection. Scanning in one direction is achieved either by controlling the direction of intracavity laser propagation by electro-optically adjusting the path of the least optical loss or by sweeping the beam externally of the laser cavity through use of a traveling wave electro-optic beam deflector. Scanning in the other direction is provided by allowing the wavelength controlled output to strike a fixed diffraction grating outside the laser cavity.

The system incorporating the method may comprise a wavelength-controlled dye laser output which is selectively deflected by a traveling wave deflector for one direction of scan and diffracted for the orthogonal direction of scan by a fixed diffraction grating wherein the amount of deflection produced by the grating is determined primarily by the laser output wavelength. In another embodiment, the system may comprise a laser cavity wherein both the direction and wavelength of laser oscillation is electro-optically controlled. When allowed to strike a diffraction grating that is wavelength-dependent, output from this laser cavity can provide a two-dimensional scan on a screen or other planar surface.

The high-speed optical scanning system of the present invention may be used to provide precision high-speed optical tracking of missiles or high performance aircraft. The invention also may be used in missile guidance and imaging systems which require light-weight beam bending with no moving parts. Commercial applications of the invention include optical computer data reading, compact data storage and retrieval, and optical display applications.

What is claimed is:

1. Apparatus for producing two-dimensional laser beam scanning comprising:
   a frequency tunable laser oscillator having a resonant cavity of fixed dimensions;
   a frequency scannable traveling wave driver having lines of constant refractive index disposed in the path of the beam output of and outside of said cavity for selectively linearly deflecting said beam output;
   means outside said laser cavity for amplifying said linearly deflected beam output; and
   means disposed outside of said cavity in the path of said amplified beam output and responsive to the frequencies of said tunable laser for selectively deflecting said beam output orthogonal to said selective linear deflection thereof.

2. The apparatus defined in claim 1 wherein said tunable laser includes a frequency tuner in said cavity and said means for amplifying includes a free running dye laser oscillator having a directionally degenerate cavity.

3. The apparatus defined in claim 2 wherein said means for orthogonally deflecting said beam output is a diffraction grating having grooves which are normal to said lines of constant refractive index of said traveling wave driver.

4. The apparatus defined in claim 3 wherein said frequency scannable traveling wave driver is a diffractive electro-optic beam deflector.

5. A method of deflecting the beam of a frequency controlled dye laser having a resonant cavity in a two-dimensional scan comprising:
   angularly deflecting the laser output by means of a variable frequency traveling wave electromagnetic deflector disposed outside of the resonant cavity of the frequency controlled dye laser;
   amplifying the weak deflected first diffractive order of said deflected beam by passing said first order beam through a non-wavelength selective dye laser regenerative amplifier having a directionally degenerate resonant cavity; and
   deflecting the amplified beam in a direction orthogonal to the direction of deflection produced by the deflector by means of a diffraction grating disposed in the path of the amplified beam so that a two-dimensional scan of said beam may be produced by selective operation of the traveling wave selector of said frequency controlled dye laser and the laser wavelength selector.

6. A method of deflecting the beam of a broadband non-frequency controlled dye laser having a traveling wave selector in a two-dimensional scan comprising:
   angularly deflecting the laser output by means of a variable frequency traveling wave electromagnetic deflector disposed outside of the cavity of said dye laser;
   selectively amplifying a narrow, tunable, controlled component of the broadband dye laser output by passing said output through a wavelength selective dye laser regenerative amplifier; and
   deflecting the amplified beam in a direction orthogonal to the direction of the deflection produced by said deflector by means by a diffraction grating disposed in the path of the amplified beam so that a two-dimensional scan of said beam may be produced by selective operation of the traveling wave selector and the laser wavelength selector.

* * * * *